(12) United States Patent
Konishi et al.

(10) Patent No.: US 7,342,742 B2
(45) Date of Patent: Mar. 11, 2008

(54) MAGNETIC RECORDING AND REPRODUCTION APPARATUS

(75) Inventors: Akio Konishi, Hyogo (JP); Koichiro Hirabayashi, Osaka (JP); Yoshiyuki Saito, Osaka (JP); Hiroshi Kurumatani, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 460 days.

(21) Appl. No.: 10/820,281

(22) Filed: Apr. 8, 2004

(65) Prior Publication Data

US 2004/0240103 A1 Dec. 2, 2004

(30) Foreign Application Priority Data

Apr. 9, 2003 (JP) .............................. 2003-105082

(51) Int. Cl.
*G11B 15/665* (2006.01)
(52) U.S. Cl. ..................... 360/84; 360/85; 360/130.23
(58) Field of Classification Search ................. 360/85, 360/95, 130.22, 130.23, 130.24, 84
See application file for complete search history.

(56) References Cited

U.S. PATENT DOCUMENTS

| | | | | |
|---|---|---|---|---|
| 5,293,283 A | * | 3/1994 | Masuda et al. ............... 360/85 |
| 5,949,609 A | * | 9/1999 | Hashimoto et al. ........... 360/85 |
| 6,256,167 B1 | * | 7/2001 | Konishi et al. ........ 360/130.23 |
| 6,342,988 B1 | * | 1/2002 | Matsuoka et al. ............ 360/95 |
| 7,032,852 B2 | * | 4/2006 | Oh et al. ................. 242/338.4 |
| 2005/0280929 A1 | * | 12/2005 | Sim et al. ..................... 360/85 |

* cited by examiner

*Primary Examiner*—Jefferson Evans
(74) *Attorney, Agent, or Firm*—Renner, Otto, Boisselle & Sklar, LLP (57) ABSTRACT

A magnetic recording and reproduction apparatus includes a rotatable head cylinder for recording information to, and/or reproducing information from, a magnetic tape; a tape pull-out member for pulling out the magnetic tape; and a guide member for guiding the tape pull-out member. The tape pull-out member is engaged with a groove formed in the guide member. The tape pull-out member is movable between a first position and a second position along the groove. The first position is a position at which information recording to, and information reproduction from, the magnetic tape is possible. The second position is a position at which information recording to, and information reproduction from, the magnetic tape is impossible. The rotatable head cylinder is provided on a cylinder holding member integrally formed with the guide member. A profile of the groove is continuous with no gap.

8 Claims, 11 Drawing Sheets

CONVENTIONAL ART

FIG.11

MAGNETIC RECORDING AND REPRODUCTION APPARATUS

This non-provisional application claims priority under 35 U.S.C., §119(a), on Patent Application No. 2003-105082 filed in Japan on Apr. 9, 2003, the entire contents of which are hereby incorporated by reference.

BACKGROUND OF THE INVENTION

1. Field of the Invention

The present invention relates to a magnetic recording and reproduction apparatus for recording information to, and/or reproducing information from, a magnetic tape.

2. Description of the Related Art

Recently, in the field of magnetic recording and reproduction apparatuses, reduction of size, reduction of number of components, and simplification of structure have been actively pursued. Especially, a loading mechanism, which has a very complicated structure and includes a large number of components, significantly influences the size and cost of the video tape recorders. The development of the loading mechanism is very important.

Hereinafter, a conventional tape loading mechanism described in Japanese Laid-Open Publication No. 11-328773 will be described with reference to FIGS. 10 and 11.

Figure 10:
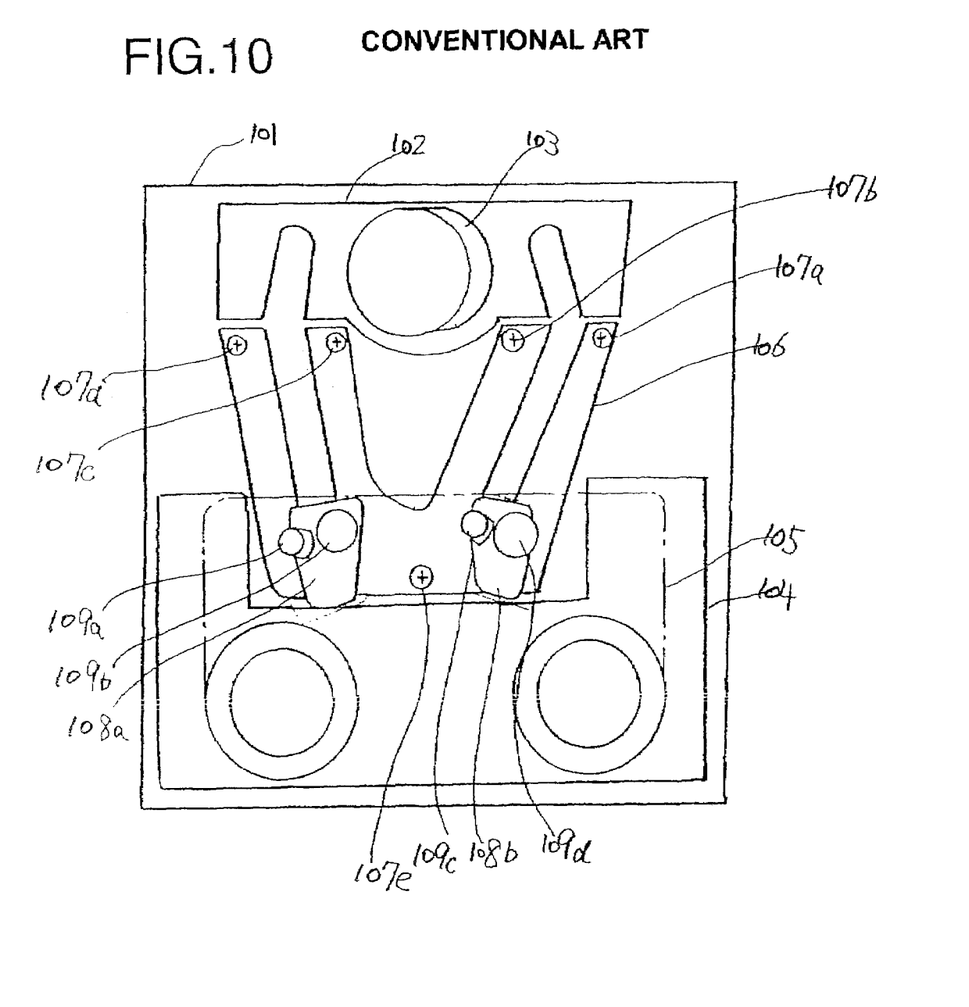
FIG. 10 is a plan view of the conventional magnetic recording and reproduction apparatus at a cassette mountable position.

FIG. 10 is a plan view of the conventional magnetic recording and reproduction apparatus at a cassette mountable position. FIG. 11 is a plan view of the conventional magnetic recording and reproduction apparatus at a tape pull-out completion position.

Figure 11:
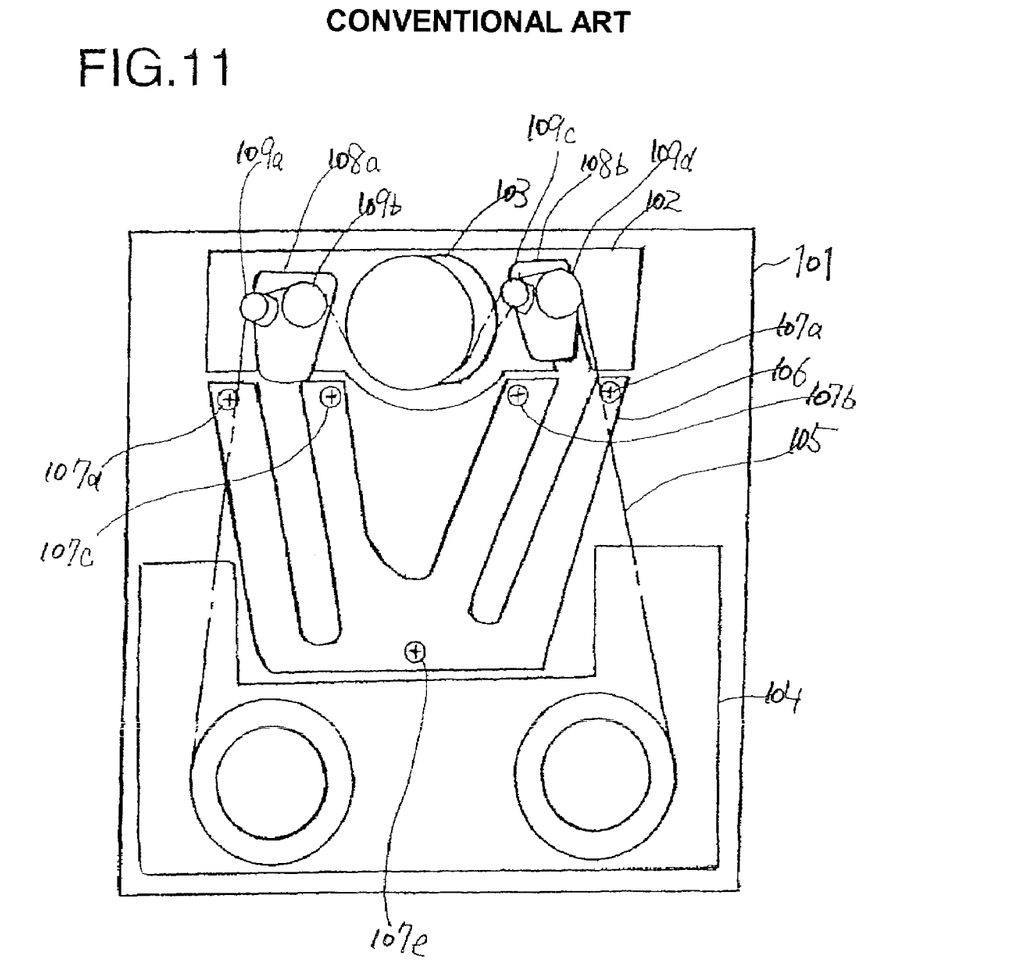
FIG. 11 is a plan view of the conventional magnetic recording and reproduction apparatus at a tape pull-out completion position.

In FIGS. 10 and 11, reference numeral 101 represents a chassis, reference numeral 102 represents a cylinder base provided on the chassis 101, and reference numeral 103 represents a rotatable head cylinder secured on the cylinder base 102. Reference numeral 104 represents a cassette which accommodates a tape 105 therein. Reference numeral 106 represents a rail which is secured to the chassis 101 by screws 107a, 107b, 107c, 107d and 107e. Reference numerals 108a and 108b each represent a boat. The boat 108a has tape pull-out posts 109a and 109b provided thereon, and the boat 108b has tape pull-out posts 109c and 109d provided thereon. The rail 106 holds and guides the boats 108a and 108b toward the cylinder base 102. The boats 108a and 108b are driven by a boat driving section (not shown), guided toward the cylinder base 102, and positioned at prescribed positions in the vicinity of the rotatable head cylinder 103 by a boat positioning section (not shown). As the boats 108a and 108b move in this way, the tape 105 in the cassette 104 is pulled out from the position shown in FIG. 10 and is wound around the rotatable head cylinder 103 as shown in FIG. 11.

The above-described structure of the conventional magnetic recording and reproduction apparatus has the following problems.

The above structure requires the rail, which is a complicated and a large component, and also requires an attaching section for securing the rail to the chassis, a space for the attaching section, and screws for attaching the rail to the chassis.

As a result, the number of components is increased, which in turn increases the cost of the tape loading mechanism. In addition, the size of the mechanism is enlarged for obtaining the space for the rail, and the freedom of design of the tape loading section is restricted.

SUMMARY OF THE INVENTION

According to one aspect of the invention, a magnetic recording and reproduction apparatus includes a rotatable head cylinder for recording information to, and/or reproducing information from, a magnetic tape; a tape pull-out member for pulling out the magnetic tape; and a guide member for guiding the tape pull-out member. The tape pull-out member is engaged with a groove formed in the guide member. The tape pull-out member is movable between a first position and a second position along the groove. The first position is a position at which information recording to, and information reproduction from, the magnetic tape is possible. The second position is a position at which information recording to, and information reproduction from, the magnetic tape is impossible. The rotatable head cylinder is provided on a cylinder holding member integrally formed with the guide member. A profile of the groove is continuous with no gap.

According to another aspect of the invention, a magnetic recording and reproduction apparatus for performing information recording to, and/or information reproduction from, a tape which is run after being pulled out from a tape cassette and wound around a rotatable head cylinder is provided. The magnetic recording and reproduction apparatus includes a tape pull-out member which is located in an opening of the tape cassette in a cassette mountable: state, and, while moving toward a tape pull-out completion position in the vicinity of the rotatable head cylinder, pulls out the tape from the tape cassette and winds the tape around the rotatable head cylinders so as to place the magnetic recording and reproduction apparatus into a tape pull-out completion state; where the cassette mountable state is a state of the magnetic recording and reproduction apparatus in which the tape cassette can be mounted thereon, and the tape pull-out completion state is a state of the magnetic recording and reproduction apparatus in which the tape has been pulled out from the tape cassette and wound around the rotatable head cylinder such that the tape is capable of running; a boss portion included in the tape pull-out member; and a guide member for guiding the tape pull-out member such that the tape pull-out member is reciprocally movable between the opening in the tape cassette and the tape pull-out is completion position. The tape pull-out member is movable on a top surface of the guide member. The guide member has a groove which is engaged with the boss portion. A profile of the groove is continuous with no gap.

According to still another aspect of the invention, a magnetic recording and reproduction apparatus for performing information recording to, and/or information reproduction from, a tape which is run after being pulled out from a tape cassette and wound around a rotatable head cylinder is provided. The magnetic recording and reproduction apparatus includes a tape pull-out member which is located in an opening of the tape cassette in a cassette mountable state, and, while moving toward a tape pull-out completion position in the vicinity of the rotatable head cylinder, pulls out the tape from the tape cassette and winds the tape around the rotatable head cylinder, so as to place the magnetic recording and reproduction apparatus into a tape pull-out completion state; where the cassette mountable state is a state of the magnetic recording and reproduction apparatus in which the tape cassette can be mounted thereon, and the tape pull-out completion state is a state of the magnetic recording and reproduction apparatus in which the tape has been pulled out from the tape cassette and wound around the rotatable head cylinder such that the tape is capable of running; a guide member for guiding the tape pull-out member such that the tape pull-out member is reciprocally movable between the opening in the tape cassette and the tape pull-out completion position; and a cylinder holding member having the rotatable head cylinder provided thereon, the cylinder holding member being integrally formed with the guide member.

In one embodiment of the invention, the cylinder holding member and the guide member include at least one resin selected from the group consisting of PPS (polyphenylene sulfide), PES (polyether sulfone), PEI (polyetherimide), PC (polycarbonate), PA (polyamide), PI (polyimide), PBT (polybutylenetelephthalate), PPE (denatured polyphenylene ether), LCP (liquid crystal polymer), and PEEK (polyetheretherketone).

In one embodiment of the invention, the magnetic recording and reproduction apparatus further includes a positioning section for positioning the tape pull-out member at the tape pull-out completion position. The positioning section, the guide member and the cylinder holding member are integrally formed together.

In one embodiment of the invention, the magnetic recording and reproduction apparatus further includes a cylinder holding member having the rotatable head cylinder provided thereon, the cylinder holding member being integrally formed with the guide member. The cylinder holding member and the guide member include at least one resin selected from the group consisting of PPS (polyphenylene sulfide), PES (polyether sulfone), PEI (polyetherimide), PC (polycarbonate), PA (polyamide), PI (polyimide), PBT (polybutylenetelephthalate), PPE (denatured polyphenylene ether), LCP (liquid crystal polymer), and PEEK (polyetheretherketone).

In one embodiment of the invention, the magnetic recording and reproduction apparatus further includes a cylinder holding member having the rotatable head cylinder provided thereon; and a positioning section for positioning the tape pull-out member at the tape pull-out completion position. The cylinder holding member, the guide member and the positioning member are integrally formed together.

In one embodiment of the invention, the boss portion has a stepped portion. The tape pull-out member includes a U-shaped boat plate. The boss portion has a pivotable boat driving member. The boat driving member is provided between the stepped portion and the boat plate. The magnetic recording and reproduction apparatus is assembled such that the tape pull-out member is movable relative to the guide member by inserting the boss portion into the groove, engaging the boat driving member with the boss portion; and then elastically deforming the boat plate and engaging the boat plate with the stepped portion.

According to a magnetic recording and reproduction apparatus of the present invention, the cylinder holding section having the rotatable head cylinder provided thereon and the guide member for guiding the tape pull-out member are integrally formed together.

Thus, the invention described herein makes possible the advantages of providing a magnetic recording and reproduction apparatus including a simple, compact and low-cost loading mechanism which has a smaller number of components and can be designed with a higher level of freedom.

These and other advantages of the present invention will become apparent to those skilled In the art upon reading and understanding the following detailed description with reference to the accompanying figures.

DESCRIPTION OF THE PREFERRED EMBODIMENTS

Hereinafter, the present invention will be described by way of illustrative examples with reference to FIGS. 1 through 9.

A magnetic recording and reproduction apparatus according to the present invention includes a chassis structure. The chassis structures includes a main chassis 21 and a sub chassis 1.

Figure 1:
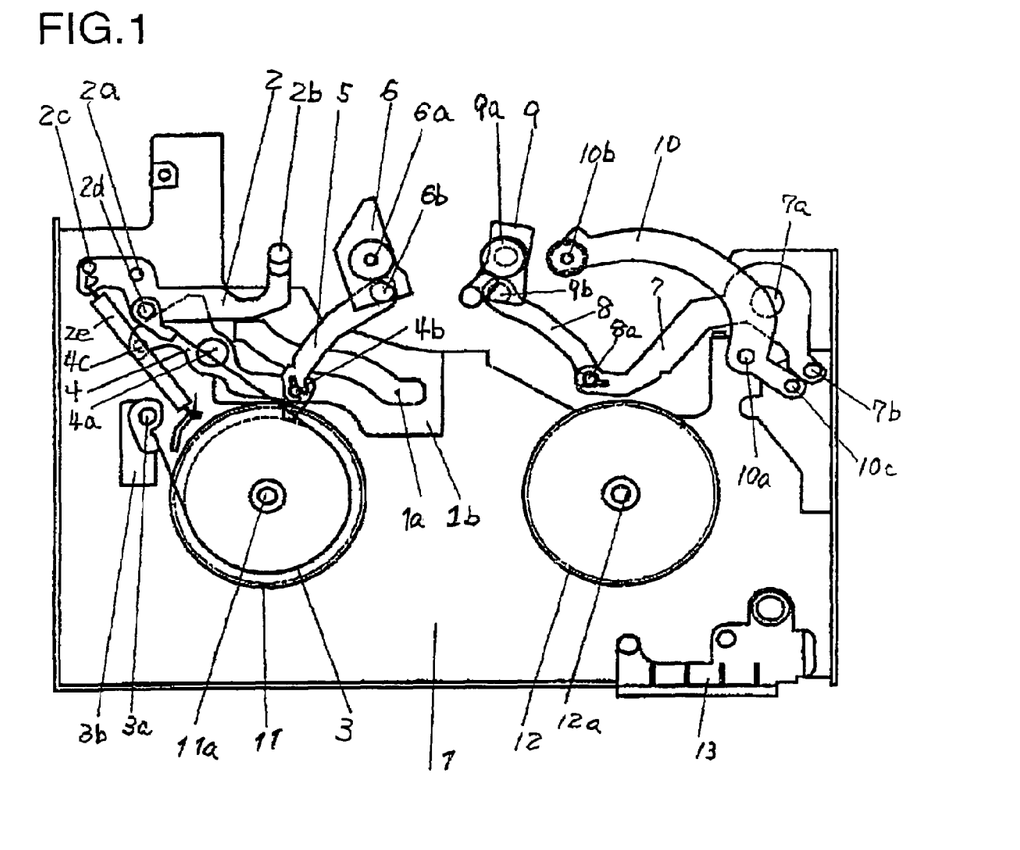
FIG. 1 is a plan view of a sub chassis of a magnetic recording and reproduction apparatus according to the present invention.

First, a structure of the sub chassis 1 of the magnetic recording and reproduction apparatus will be described. FIG. 1 is a plan view of the sub chassis 1.

A sub chassis 1 has a TR arm 2, an S boat 6, a T boat 9 and a T3 arm 10 provided thereon. These tape pull-out members 2, 6, 9 and 10 act to pull out a magnetic tape (not shown in FIG. 1) from a tape cassette.

The TR arm 2 is supported so as to be pivotable about a support 2a on the sub chassis 1. A TR post 2b is provided on a top surface of one end of the TR arm 2, and a TR arm driving pin 2c is provided on a bottom surface of the other end of the TR arm 2.

The T3 arm 10 is supported so as to be pivotable about a support 10a on the sub chassis 1. A T3 post 10b is provided on a top surface of one end of the T3 arm 10, and a T3 arm driving pin 10c is provided on a bottom surface of the other end of the T3 arm 10.

An S arm 4 is supported so as to be pivotable about a support 4a on the sub chassis 1. An S arm driving pin 4c is provided on a bottom surface of one end of the S arm 4, and an S link pin 4b is provided on a top surface of the other end of the S arm 4.

An S link 5 is pivotably attached to the S link pin 4b at one end of the S link 5. The S boat 6 is pivotably attached to the other end of the S link 5 via a boss portion 6b.

A T arm 7 has substantially the same structure as that of the S arm 4. Specifically, the T arm 7 is supported to be pivotable about a support 7a on the sub chassis 1. A T arm driving pin 7b is provided on a bottom surface of one end of the T arm 7, and a T link pin 8a is provided on a top surface of the other end of the T arm 7.

A T link 8 is pivotably attached to the T link pin 8a at one end of the T link 8. The T boat 9 is pivotably attached to the other end of the T link 8 via a boss portion 9b.

The S boat 6 has an S roller post 6a provided thereon for guiding the magnetic tape, and the T boat 9 has a T roller post 9a provided thereon for guiding the magnetic tape.

As described above all the tape pull-out members 2, 6, 9 and 10 are provided on the sub chassis 1.

An S reel stand 11 and a T reel stand 12 are supported so as to be pivotable about a shaft 11a and a shaft 12a, respectively. The S reel stand 11 and the T reel stand 12 are engaged with respective reel hubs of the tape cassette (not shown) when the tape cassette is mounted on the sub chassis 1. This engagement allows the magnetic tape to be taken in.

A brake band (TR band) 3 for controlling the tension of the magnetic tape while the magnetic tape is running is wound around the S reel stand 11. One end of the TR band 3 is supported about a pivotable member 2d of the TR arm 2, and the other end of the TR band 3 is supported about a pivotable member 3a on the sub chassis 1. While the magnetic tape is running, a load acts on the S reel stand 11 via the TR band 3 by a force of a TR spring 2e attached to the TR arm 2.

In a sub chassis adjusting plate 1b, a groove 1a is formed. The sub chassis adjusting plate 1b is secured to the sub chassis 1 by a screw (not shown).

Figure 2:
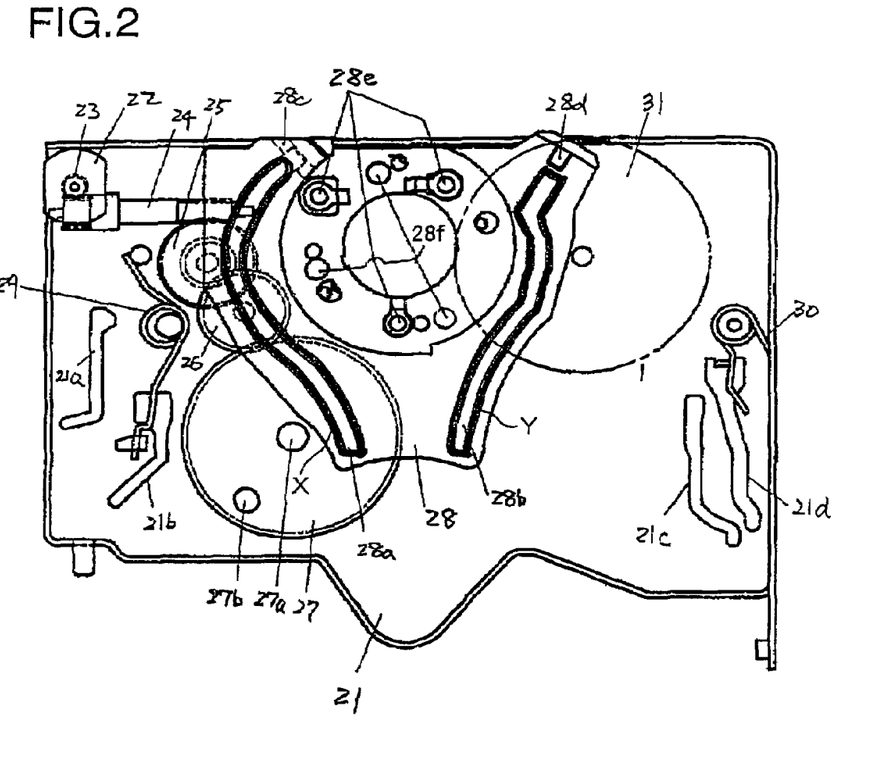
FIG. 2 is a plan view of a main chassis of the magnetic recording and reproduction apparatus according to the present invention.

Next, a structure of the main chassis 21 of the magnetic recording and reproduction apparatus according to the present invention will be described. FIG. 2 is a plan view of the main chassis 21.

The main chassis 21 has four cam grooves 21a, 21b, 21c and 21d formed therein.

A motor 22 is rotatable forward and backward. A rotation force of the motor 22 is conveyed to a mode gear 27 via a motor worm 23, a connection worm 24, and gears 25 and 26. The mode gear 27 is rotatable about a support 27a. A sub chassis driving pin 27b is provided on a top surface of the mode gear 27. The sub chassis driving pin 27b is engaged with the sub chassis 1 (FIG. 1), so that the sub chassis 1 is movable relative to the main chassis 21.

Reference numeral 28 represents a cylinder base 28 (guide member). On the cylinder base 28, three attaching sections 28e and three attaching sections 28f are provided. The cylinder base 28 is attached to the main chassis 21 with the three attaching sections 28e. A rotatable head cylinder 32 (FIG. 5) is attached to the cylinder base 28 with the three attaching sections 28f. The rotatable head cylinder 32 Is for recording information to, and/or reproducing information from, for example, the magnetic tape. The attaching sections 28e and 28f each act as a cylinder holding section.

The attaching sections 28e and 28f are, for example, projections. The cylinder base 28 is attached to the main chassis 21 by engaging the three attaching sections 28e with holes formed in the main chassis 21, respectively. The rotatable head cylinder 32 is attached to the cylinder base 28 by engaging the three attaching sections 28f with holes formed in the rotatable head cylinder 32.

The attaching sections 28a and 28f are not limited to projections as long as they are integrally formed with the cylinder base 28.

For example, the attaching sections 28e and 28f may be screw holes. In this case, the cylinder base 28 is attached to the main chassis 21 by placing the cylinder base 28 on the main chassis 21 and screwing the cylinder base 28 to the main chassis 21 from the rear surface of the main chassis 21 through the screw holes acting as attaching sections 28e. The rotatable head cylinder 32 is attached to the cylinder base 28 by placing the rotatable head cylinder 32 on the cylinder base 28 and screwing the rotatable head cylinder 32 to the cylinder base 28 from the rear surface of the cylinder base 28 through the screw holes acting as attaching sections 28f.

Guide grooves 28a and 28b are respectively provided for guiding the S boat 6 and the T boat 9 mounted on the sub chassis 1 when the S boat 6 and the T boat 9 pull out the magnetic tape from the tape cassette. Elastic twisted coil springs 29 and 30 are secured on the main chassis 21 in the state of being provided with a pressure by a prescribed force. The S arm 4, the S link 5 and the twisted coil spring 29 act together as a boat driving member. The T arm 7, the T link 8 and the twisted coil spring 30 act together as a boat driving member.

Reference numerals 28c and 28d are positioning sections for positioning the S boat 6 and the T boat 9 when the tape has been pulled out. The S boat 6 and the T boat 9 can be pressed by twisted coil springs 29 and 30 toward, and thus positioned by, the positioning sections 28c and 28d, respectively.

The profile of each of the guide grooves 28a and 28b (represented by thick lines X and Y in FIG. 2) is continuous with no gap. For example, in a surface of the cylinder base 28 on which the S boat 6 and the T boat 9 can move, the profile of the guide grooves 28a and 28b is closed with no gap.

The attaching sections 28e and 28f and the positioning sections 28c and 28d are integrally formed with a resin. The cylinder base 28 is attached to the main chassis 21 only at the three attaching sections 28e. There is no attaching section for attaching the cylinder base 28 to the main chassis 21 around the guide grooves 28a and 28b.

The attaching sections 28e and 28f and the positioning sections 28c and 28d, for example, include at least one resin selected from the group consisting of at least one of PPS (polyphenylene sulfide), PES (polyether sulfone), PEI (polyetherimide), PC (polycarbonate), PA (polyamide), PI (polyimide), PBT (polybutylenetelephthalate), PPE (denatured polyphenylene ether), LCP (liquid crystal polymer), and PEEK (polyetheretherketone).

Figure 3:
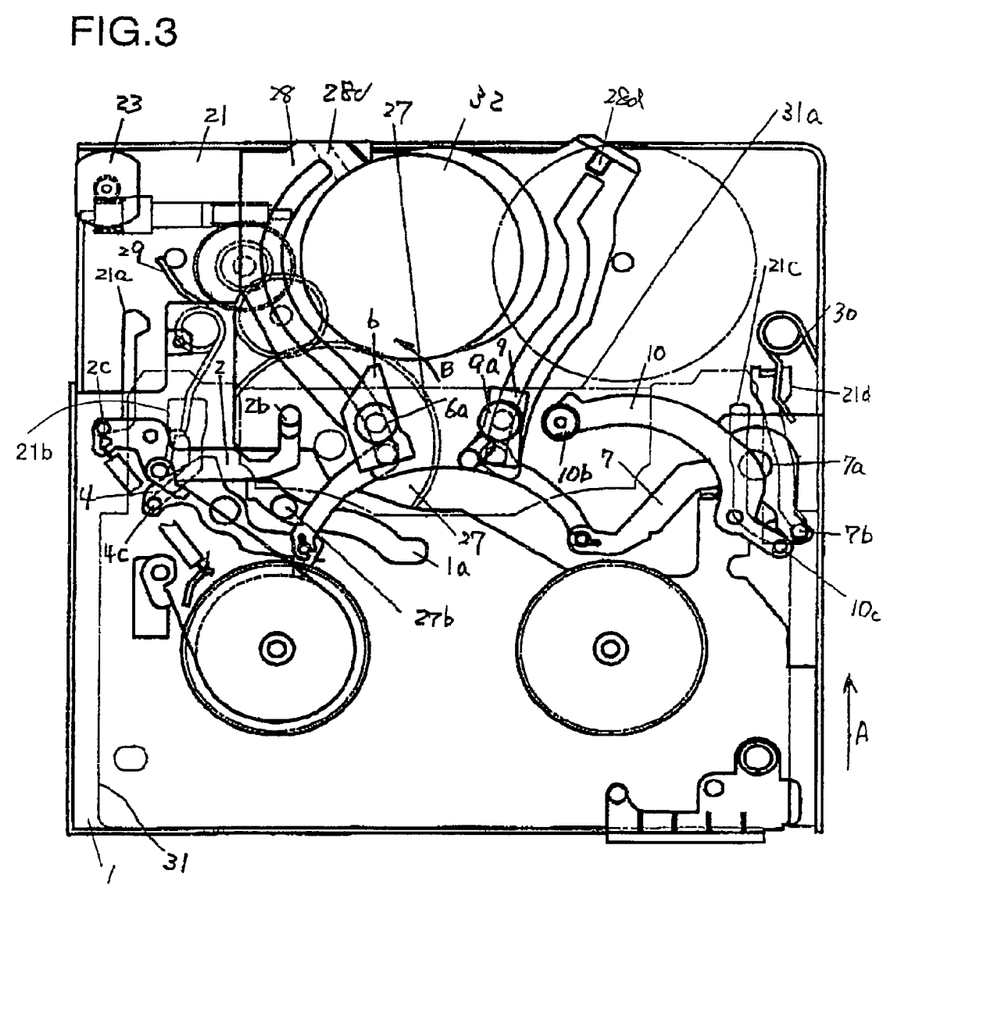
FIG. 3 is a plan view of the magnetic recording and reproduction apparatus according to the present invention in a tape cassette mountable state.

FIG. 3 is a plan view of the magnetic recording and reproduction apparatus according to the present invention, which is obtained by placing the sub chassis 1 shown in FIG. 1 on the main chassis 21 shown in FIG. 2. In FIG. 3, the magnetic recording and reproduction apparatus is in the state where the cassette is mountable on the sub chassis 1.

The sub chassis 1 is guided so as to be movable with respect to the main chassis 21 in a direction represented by arrow A. The TR arm driving pin 2c of the TR arm 2 is slidably engaged with the cam groove 21a of the main chassis 21. The T3 arm driving pin 10c of the T3 arm 3 is slidably engaged with the cam groove 21c of the main chassis 21. The S arm driving pin 4c of the S arm 4 is engaged with the cam groove 21b of the main chassis 21.

The T arm driving pin 7b of the T arm 7 is engaged with the cam groove 21d of the main chassis 21.

The sub chassis driving pin 27b on the mode gear 27 on the main chassis 21 is engaged with the groove 1a of the sub chassis adjusting plate 1b (FIG. 1).

With reference to FIG. 3, an operation of the magnetic recording and reproduction apparatus according to the present invention will be described.

As described above, in FIG. 3, the magnetic recording and reproduction apparatus is in the state where a tape cassette can be mounted on the sub chassis 1. In this state, the posts 2b, 6a, 9a and 10b of the tape pull-out members 2, 6, 9 and 10 are all inside the perimeter of the magnetic tape 31a, i.e., In the opening of the tape cassette. In this specification this position of the tape pull-out members is defined as the "position at which information recording to, and/or information reproduction from, the tape is impossible (second position)". The state of the magnetic recording and reproduction apparatus where all the posts 2b, 6a, 9a and 10b are at the second position is defined as the "state where the cassette is mountable (cassette mountable state)".

When the motor 22 rotates in this state, the mode gear 27 rotates in a direction represented by arrow B, and the sub chassis driving pin 27b also moves in the direction of arrow B. The sub chassis driving pin 27b moves in the groove 1a of the sub chassis adjusting plate 1b, which moves the sub chassis 1 in the direction of arrow A.

With reference to FIGS. 4A through 4F, an operation of the sub chassis 1 driven by the mode gear 27, i.e., an operation of the sub chassis adjusting plate 1b secured to the sub chassis 1 will be described.

Figure 4A:
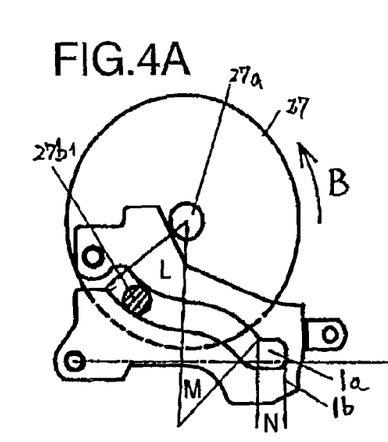
FIGS. 4A through 4F are plan views illustrating an operation of the sub chassis of the magnetic recording and reproduction apparatus according to the present invention.

In FIG. 4A, the sub chassis driving pin 27b is at a tape cassette take-out position 27b1 (the same position as in FIG. 3). As shown in FIG. 4A, the groove 1a of the sub chassis adjusting plate 1b includes an arc portion L (first arc portion), an arc portion M (second arc portion) continuous with the arc portion L, and a straight portion N continuous with the arc portion M. The arc portion L and the arc portion N are projected in opposite directions from each other.

Figure 4B:
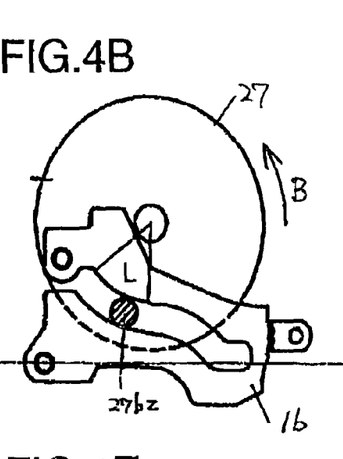

In FIG. 4B, the sub chassis driving pin 27b is at a tape cassette insertable position 27b2. The sub chassis driving pin 27b, which Is at the position 27b1 in FIG. 4A, has been moved in the arc portion L and Is located at the position 27b2 in FIG. 4B. The shape of the arc portion L is the same as the shape of an arc having the center thereof at the support 27a, about which the mode gear 27 is rotatable. The arc portion L is concentric with an arc drawn by the movement of the sub chassis driving pin 27b about the center of the mode gear 27. More specifically, the radius of the arc portion L is the same as the radius of an arc drawn by the center of the sub chassis driving pin 27b when the sub chassis driving pin 27b moves about the center of the mode gear 27. Therefore, the sub chassis adjusting plate 1b does not move in the direction of arrow A. The sub chassis adjusting plate 1b does not move since the sub chassis 1 needs to be paused between when the sub chassis driving pin 27b is at the tape cassette take-out position and when the sub chassis driving pin 27b is at the tape cassette insertable position.

Figure 4C:
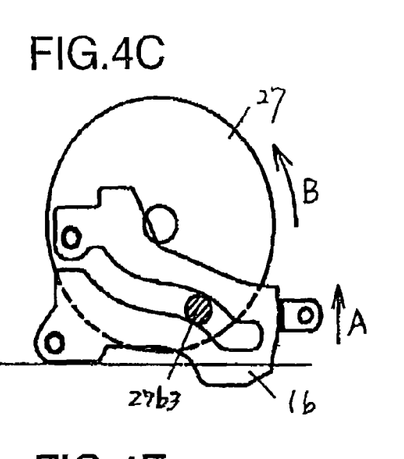

When the mode gear 27 further rotates in the direction of arrow B the sub chassis driving pin 27b moves to a position 27b3 in the arc portion M as shown in FIG. 4C. In the state of FIG. 4C, the tape is being pulled out from the tape cassette.

Since the arc portion M is not concentric with an arc drawn by the movement of the sub chassis driving pin 27b about the center of the mode gear 27, the sub chassis adjusting plate 1b is pushed by the sub chassis driving pin 27b is as to move in the direction of arrow A. This means that the sub chassis 1 also moves in the direction of arrow A.

Figure 4D:
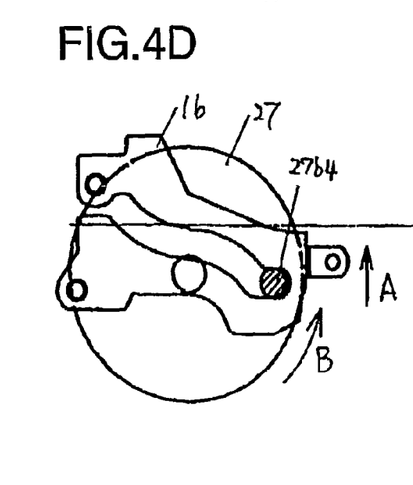

When the mode gear 27 further rotates in the direction of arrow B, the sub chassis driving pin 27b reaches a position 27b4, where the sub chassis driving pin 27b is in engagement with the straight portion N, as shown in FIG. 4D. The sub chassis 1 continuously moves in the direction of arrow A. In the state of FIG. 4D, the tape is still being pulled out from the tape cassette.

Figure 4E:
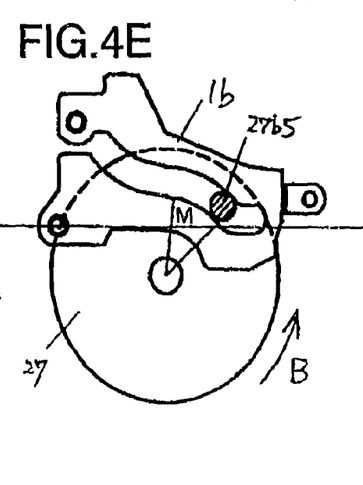

When the mode gear 27 further rotates in the direction of arrow B, the sub chassis driving pin 27b reaches a position 27b5 in the arc portion M as shown in FIG. 4E. In this state, the arc portion M Is concentric with an arc drawn by the movement of the sub chassis driving pin 27b about the center of the mode gear 27. More specifically, the radius of the arc portion M is the same as the radius of an arc drawn by the center of the sub chassis driving pin 27b when the sub chassis driving pin 27b moves about the center of the mode gear 27. Therefore, the sub chassis adjusting plate 1b is in a pause without moving in the direction of arrow A.

In the state of FIG. 4E, the sub chassis driving pin 27b is at the position 27b5. In this state, the tape has been completely pulled out, and the sub chassis 1 is at the utmost position (a tape pull-out completion position), as described below with reference to FIG. 6. The sub chassis 1 cannot move any further from this state. The mode gear 27 further rotates in the direction of arrow B in order to obtain a play mode in which the magnetic tape can run.

Figure 4F:
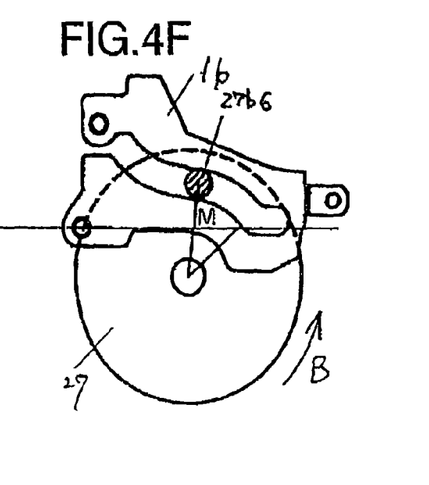

Since the sub chassis driving pin 27b is in the arc portion M which is concentric with an arc drawn by the movement of the sub chassis driving pin 27b about the center of the mode gear 27, the sub chassis adjusting plate 1b does not move in the direction of arrow A. After that, the sub chassis driving pin 27b reaches a play position 27b6 as shown in FIG. 4F. The play position is also referred to as a tape running position.

When the mode gear 27 rotates in the opposite direction from the direction of arrow B, the above-mentioned components also move in the opposite directions from those described above and the sub chassis 1 adjusting plate 1b moves in the opposite direction from the direction of arrow A.

As described above, in a simple structure where the sub chassis driving pin 27b is provided on the mode gear 27 which is rotatable, the sub chassis 1 can be stopped during a prescribed period and subsequently start moving, with the groove 1a of the sub chassis adjusting plate 1b being specifically shaped. Since the width of the groove 1a can be substantially the same as the diameter of the sub chassis driving pin 27b, the sub chassis 1 can be stably driven with no need to provide any extra gap between the groove 1a and the sub chassis driving pin 27b. Since no extra component is provided between the groove 1a and the sub chassis driving pin 27b, the transmission efficiency of the driving force is very high, which alleviates the load on the motor 22 as a driving force source. Thus, a compact and low-cost motor can be used as the motor 22.

With reference to FIGS. 3 through 6, an operation of pulling out the magnetic tape from the tape cassette by relative movement of the sub chassis 1 with respect to the main chassis 21 will be described.

Figure 5:
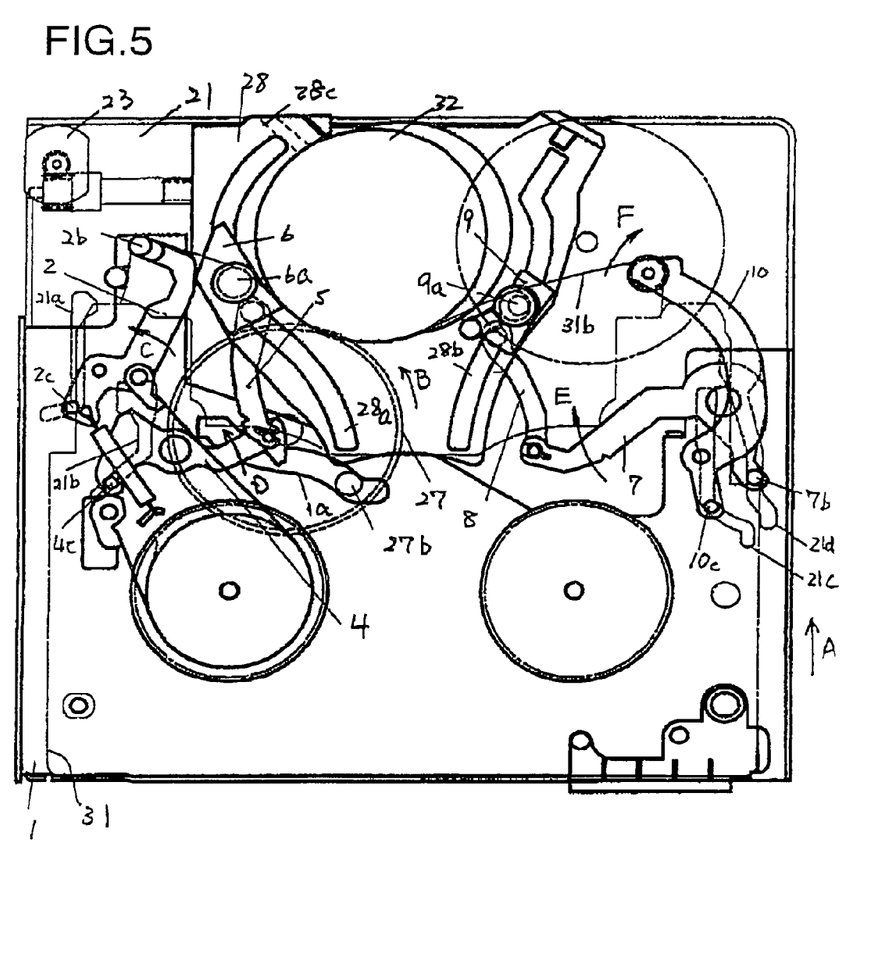
FIG. 5 is a plan view of the magnetic recording and reproduction apparatus according to the present invention in a state where the magnetic tape is being pulled out from the tape cassette.

FIG. 5 shows a state of the magnetic recording and reproduction apparatus where the sub chassis 1 moves in the direction of arrow A slightly from the state shown in FIG. 3. In FIG. 5, the sub chassis driving pin 27b and the groove 1a of the sub chassis adjusting plate 1b have the positional relationship shown in FIG. 4C. The sub chassis driving pin 27b reaches the position 27b3 shown in FIG. 4C by the movement of the mode gear 27 in the direction of arrow B.

In FIG. 5, as described above, the driving pins 2c, 4c, 7b and 10c of the elements 2, 4, 7 and 10 are respectively in engagement with the cam grooves 21a, 21b, 21d and 21c of the main chassis 21. Owing to such engagements, the elements 2, 4, 7 and 10 respectively pivot in directions represented by arrows C, D, E and F to move to the positions shown in FIG. 5. The S boat 6 and the T boat 9 are respectively guided by the guide grooves 28a and 28b to move to the positions shown in FIG. 5. As a result, the magnetic tape is pulled out to the position as represented by reference numeral 31b.

Figure 6:
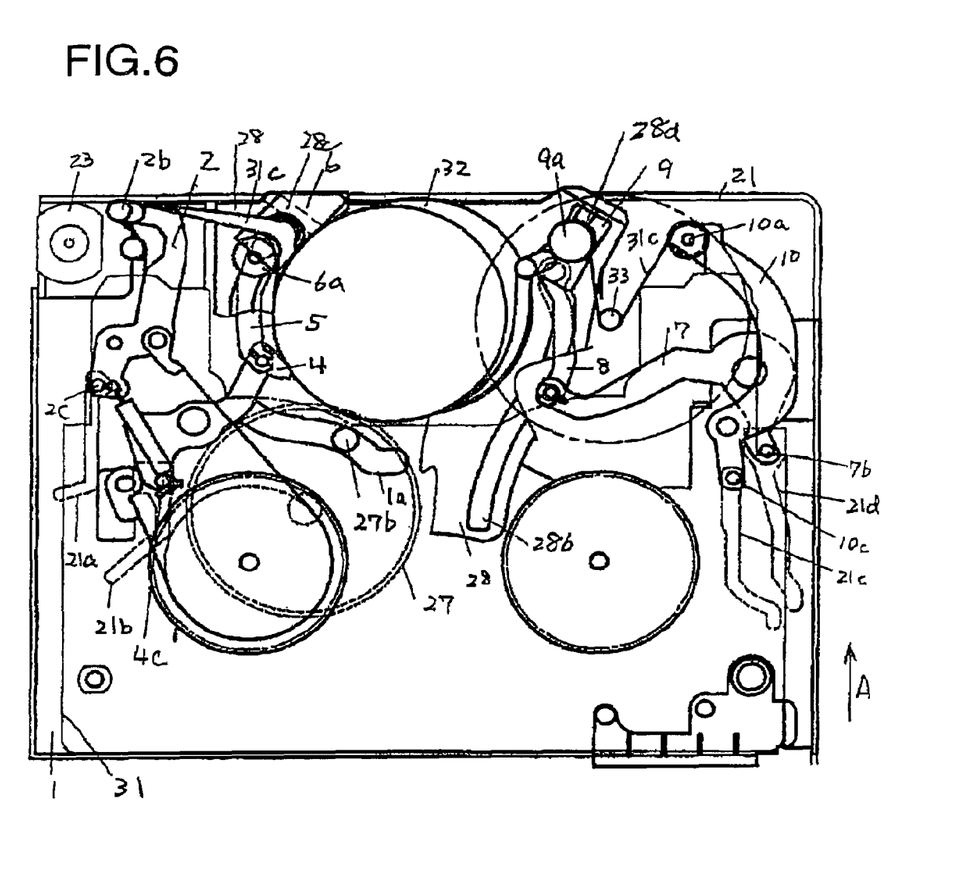
FIG. 6 is a plan view of the magnetic recording and reproduction apparatus according to the present invention in a state where the magnetic tape has been completely pulled out from the tape cassette.

FIG. 6 shows a state of the magnetic recording and reproduction apparatus, in which information recording to, or information reproduction from, the magnetic tape (represented by reference numeral 31c) is possible. In this specification, this position of the tape pull-out members is defined as the "position at which information recording to, and/or information reproduction from, the tape is possible (first position)". The state of the magnetic recording and reproduction apparatus where all the posts 2b, 6a, 9a and 10b are at the first position is defined as the "state where the tape, which has been pulled out from the cassette and wound around the rotatable head cylinder, can run (tape pull-out completion state)".

In this state, the S boat 6 and the T boat 9 are at the first position. The sub chassis 1 is at the tape pull-out completion position. This state is obtained from the state in FIG. 5 as a result of the mode gear 27 further rotating in the direction of arrow B, the sub chassis 1 further moving in the direction of arrow A, and the tape 31b being wound around a rotatable head cylinder 32 provided on the cylinder base 28 on the main chassis 21. In FIG. 6, the sub chassis driving pin 27b and the groove 1a of the sub chassis adjusting plate 1b have the positional relationship shown in FIG. 4E. Therefore, the sub chassis 1 stays at this position although the mode gear 27 further rotates in the direction of arrow B, and the pinch roller (not shown) presses the magnetic tape 31a to a capstan shaft 33 and the capstan shaft 33 rotates to place the magnetic recording and reproduction apparatus into the play mode in which the magnetic tape 31c is driven.

In the state shown in FIG. 6, the S boat 6 acting to pull out the magnetic tape from the tape cassette is pressed to a positioning section 28c via the S arm 4 and the S link 5 via the twisted coil spring 29 (FIG. 2) and thus the position of the S boat 6 is determined. Similarly, the T boat 9 also acting to pull out the magnetic tape from the tape cassette is pressed to a positioning section 28d via the T arm 7 and the T link 8 via the twisted coil spring 30 (FIG. 2) and thus the position of the T boat 9 is determined.

With reference to FIGS. 7 and 8A through 8C, such a pressing positioning mechanism will be described.

Figure 7:
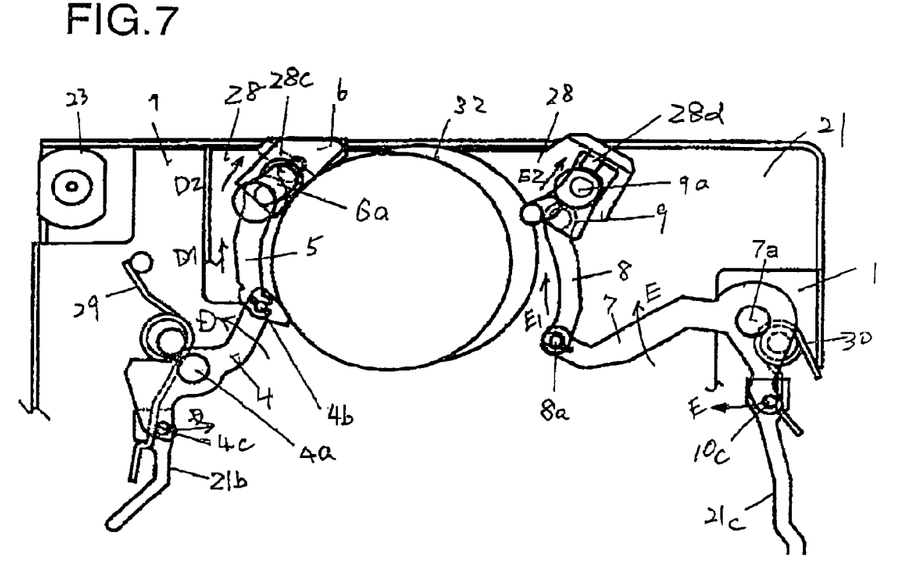
FIG. 7 is a partial view of FIG. 6 illustrating a positioning mechanism of the magnetic recording and reproduction apparatus.

FIG. 7 is a partial view of FIG. 6. With reference to FIG. 7, a method for determining the position of the S boat 6 will be described.

The S arm 4 on the sub chassis 1 reaches the position shown in FIG. 7 by the S arm driving pin 4c being guided by the cam groove 21b in the main chassis 21. In this state, the S arm driving pin 4c is in contact with the elastic twisted coil spring 29 mounted on the main chassis 21 and is flexed. Accordingly, the S arm 4 is pivoted in the direction of arrow D about the support 4a by the force of the twisted coil spring 29. This force presses the S link 5 in a direction of arrow D1 and presses the S boat 6 in a direction of arrow D2. Thus, the S boat 6 is pressed to the positioning section 28c on the cylinder base 26 and thus positioned here. In this manner, the magnetic tape is completely pulled out. Similarly, the T arm 7 is pivoted in the direction of arrow E about the support 7a by the force of the twisted coil spring 30. This force presses the T link 8 in a direction of arrow E1 and presses the T boat 9 in a direction of arrow E2. Thus, the T boat 9 is pressed to the positioning section 28d on the cylinder base 28 and thus positioned here. In this manner, the magnetic tape is completely pulled out. As described above, a pressing mechanism for the S boat 6 and the T boat 9 can be realized simply by elastic coil springs secured to the main chassis 21. A positioning mechanism for each boat can be realized by quite a simple structure. This contributes to the reduction of the number of components, size reduction and improvement in the quality of the tape pull-out mechanism.

Figures 8A, 8B:
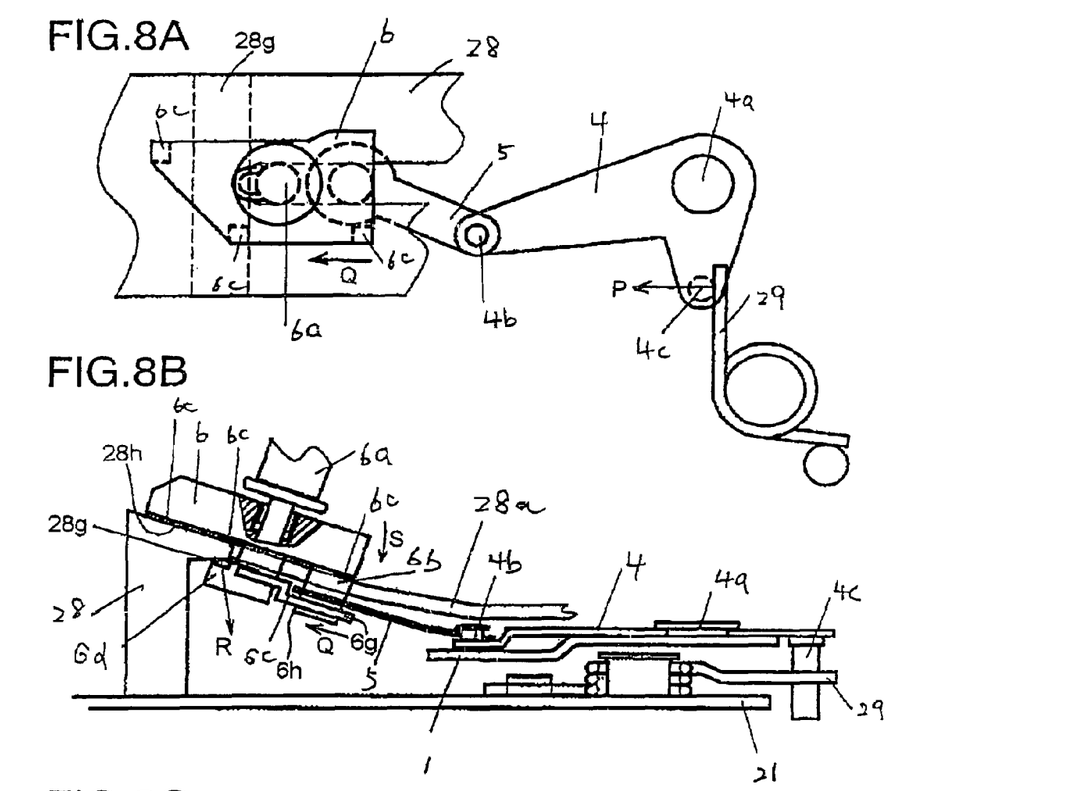
FIG. 8A is a plan view of the positioning mechanism shown in FIG. 7.
FIG. 8B is a side view thereof.
Figure 8C:
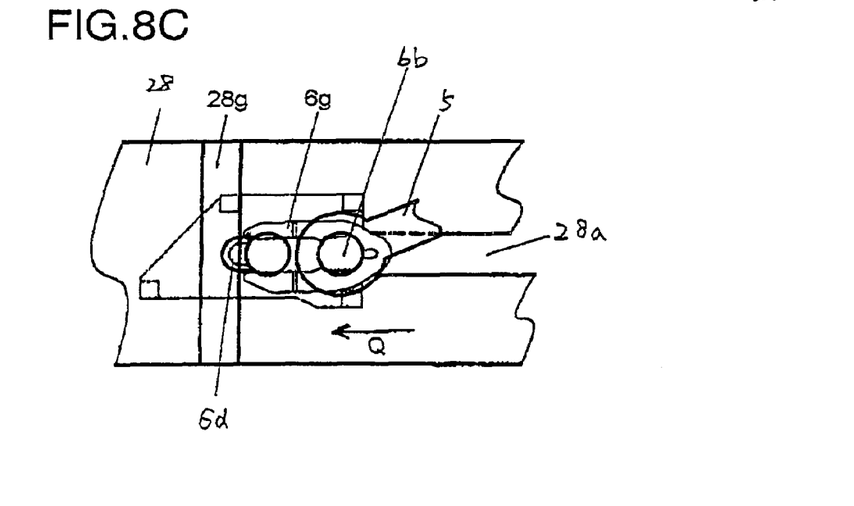
FIG. 8C is a bottom view thereof.

With reference to FIGS. 8A through 8C, the positioning mechanism for the S boat 6 will be described in more detail.

FIG. 8A is a plan view of the positioning mechanism for the S boat 6, FIG. 8B is a side view thereof, and FIG. 8C is a bottom view thereof. In FIGS. 8A through 8C, the elements are shown schematically.

The S arm 4 is urged by the elastic coil spring 29 in a direction represented by arrow P. Thus, a portion of the boss portion 6b which Is below the guide groove 28a is pressed by the S link 5 (FIG. 8B). The S boat 6 includes a projection 6d having a semi-circular planar shape (FIG. 8C) integrally provided at a forward position on a bottom of the S boat 6. The cylinder base 28 has a ramp surface 28g on a bottom surface thereof in the vicinity of the cylinder (not shown). The ramp surface 28g is provided such that a normal thereto is in a direction of arrow R.

With reference to FIGS. 8A through 8C an operation of the positioning mechanism for the S boat 6 will be described.

The lower portion of the boss portion 6b engaged with the S boat 6 is pressed by the S link 5, and thus the projection 6d of the S boat 6 is pressed to the ramp surface 28g of the cylinder base 28. Accordingly, the entire S boat 6 is pressed in the direction of arrow Q while receiving a force in the direction of arrow R. Since the boss portion 6b is pressed in the direction of arrow Q, the S boat 6 also receives a force in a direction of arrow S. As a result, three reference points 6c on the bottom surface of the S boat 6 contact a top reference surface 28h of the cylinder base 28. The top reference surface 28h of the cylinder base 28 and the reference points 6c on the bottom surface of the S boat 6 are formed with high precision. By contact of the top reference surface 28h of the cylinder base 28 and the reference points 6c on the bottom surface of the S boat 6, the S boat 6 is positioned with respect to the cylinder base 28 with high precision.

As described above, the S boat 6, which is a tape pull-out member, can be positioned with high precision by a compact and low-cost simple structure with a small number of components, i.e. by a structure of integrally providing the projection 6d in the S boat 6 and providing the ramp surface 28g in the cylinder base 28. The S roller post 6a is provided on the S boat 6. The tilt of the S roller post 6a with respect to the main chassis 21 is very important for tape running. Owing to the above-described structure, the present invention allows such an important post to be positioned with high precision with a very simple structure. This significantly contributes to the reduction of the number of components of, and the size of, the tape loading mechanism, and also to the improvement in performance.

The positioning mechanism for the T boat 9 has substantially the same structure and operates in substantially the same manner as described above regarding the S boat 6.

Figure 9:
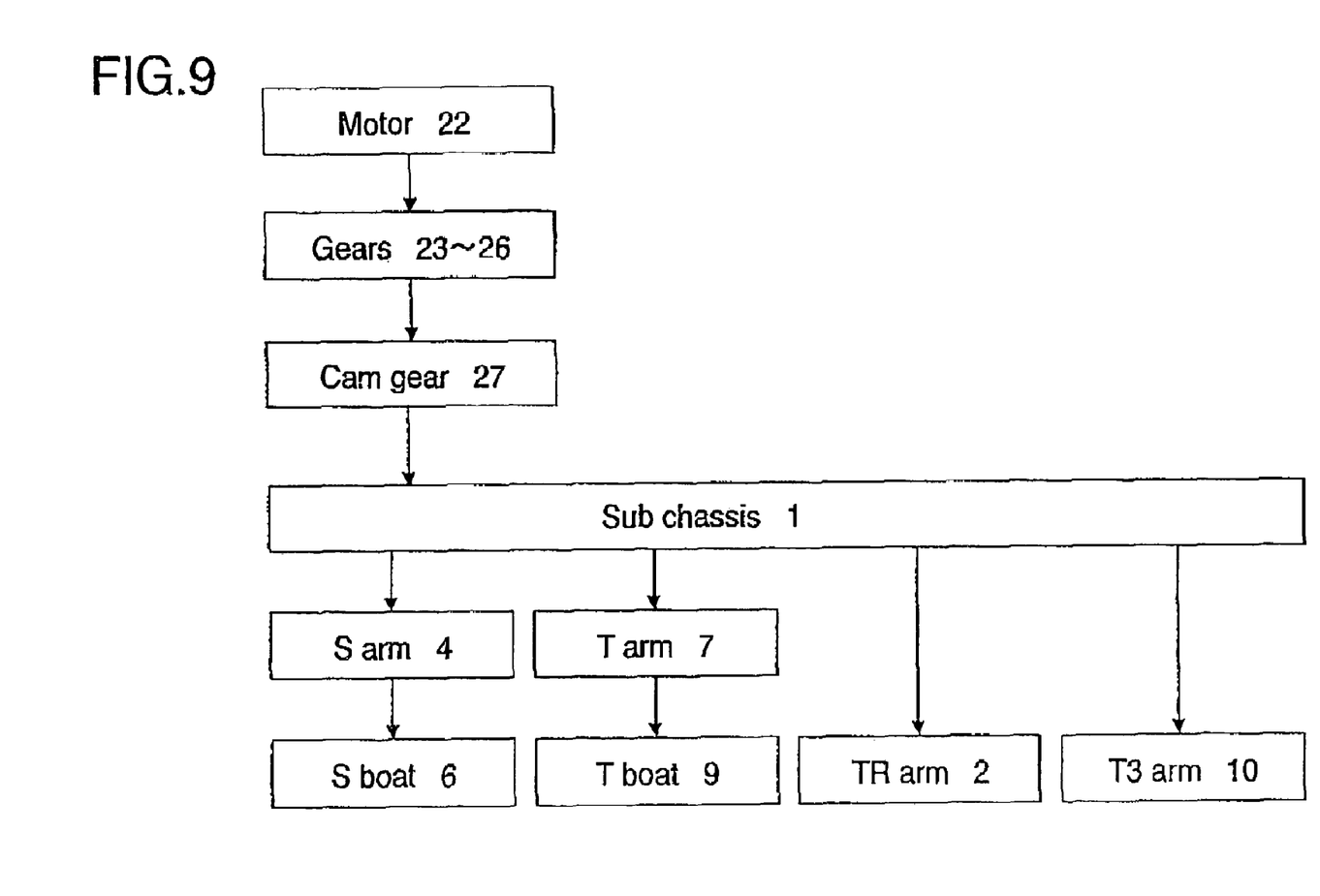
FIG. 9 shows a flow of force generated by a motor of the magnetic recording and reproduction apparatus according to the present invention.

FIG. 9 shows a flow of a driving force in the magnetic recording and reproduction apparatus according to the present invention. The force generated by the motor in the magnetic recording and reproduction apparatus is streamlined according to the present invention. A simple flow of force by which elements acting for pulling out a magnetic tape from the tape cassette are moved by the movement of the sub chassis is realized.

In the above example, the profile of each of the guide grooves 28a and 28b is continuous with no gap on a plane on which the S boat 6 and the T boat 9 are movable. The attaching sections 28e and 28f and the positioning sections 28c and 28d are integrally formed of a resin. Thus, the number of components of the magnetic recording and reproduction apparatus is reduced, and the space required for attaching components is also reduced. This increases the degree of design freedom of the tape loading mechanism of the magnetic recording and reproduction apparatus.

As shown in FIG. 2, the main chassis 21 has an irregular shape. This occurs since the reduction in the number of components generates an extra space in the main chassis 21 and that extra space is eliminated. In this manner, the size of the tape pull-out mechanism is also reduced.

In the above example, the twisted coil springs 29 and 30 are used as elastic members. The same effect is provided by using any elastic members such as, for example, leaf springs or resin springs.

According to the present invention, as described above, the structure of the cylinder holding section and the guide member for tape pull-out member is simplified. This reduces the number of components and the space for attaching the components, and increases the design freedom of the loading mechanism.

In an embodiment in which the cylinder holding section and the guide member for the tape pull-out member are integrally formed and the profile of the guide groove is continuous with no gap on the surface on which the tape pull-out member is movable, the number of the components and the size and weight of the magnetic recording and reproduction apparatus are decreased.

For example, the cylinder holding section and the guide member include at least one resin selected from the group consisting of PPS (polyphenylene sulfide), PES (polyether sulfone), PEI (polyetherimide), PC (polycarbonate), PA (polyamide), PI (polyimide), PBT (polybutylenetelephthalate), PPE (denatured polyphenylene ether), LCP (liquid crystal polymer), and PEEK (polyetheretherketone).

With reference to FIGS. 8A through 8C, while the magnetic recording and reproduction apparatus according to the present invention is assembled, the boss portion 6b is inserted into the guide groove 28a, and the boat driving member (for example, the S arm 4, the S link 5 and the twisted coil spring 29) is engaged with the boss portion 6b (in this example, the S link 5 is outserted to the boss 6b). Then, a U-shaped boat plate 6g is elastically deformed and engaged with a stepped portion 6h formed in the boss portion 6b. Thus, the tape pull-out member is made movable relative to the cylinder base 28.

For example, while the magnetic recording and reproduction apparatus according to the present invention is assembled, the S boat 6 can be movably attached to the cylinder base 28 by simply performing the following steps in the state where the cylinder base 28 is attached to the main chassis 21. The S boat 6 is inserted into the guide groove 28a vertically from the above, and the S link 5 is outserted to the boss portion 6b. Then, the U-shaped boat plate 6g is horizontally outserted to the boss 6b in the direction of arrow Q so as to be movable on the cylinder base 28.

No screw is necessary to attach the boat plate 6g to the boss portion 6b. The cylinder base 28, the S link 5 and the S boat 6 are easily assembled together.

The components related to the T boat 9 are assembled in substantially the same manner as described above regarding the S boat 6.

Owing to such a structure, the design freedom of components requiring high precision, for example, the guide grooves and the boats, is improved. A magnetic recording and reproduction apparatus requiring a small number components is realized.

The elements described in the above example are not limited to the embodiments described above, and may have any structure or may operate in any manner as long as the they have the above-described respective functions.

In a magnetic recording and reproduction apparatus according to the present invention, the cylinder holding section having the rotatable head cylinder thereon is integrally formed with the guide member for guiding the tape pull-out member. The profile of the groove formed in the guide member is continuous with no gap. Accordingly, the cylinder holding member and the guide member do not need to be produced as separate members, which decreases the number of components of the magnetic recording and reproduction apparatus.

As described above, according to the present invention, the cylinder holding member and the guide member are integrally formed together. The profile of the groove in the guide member is continuous with no gap on a surface of the guide member on which the tape pull-out member is movable. Therefore, the number of components is reduced, and the space required for attaching the components is also reduced, and thus the degree of design freedom of the tape loading mechanism is enhanced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording and reproduction apparatus, comprising:
   a rotatable head cylinder for recording information to, and/or reproducing information from, a magnetic tape of a tape cassette;
   a tape pull-out member for pulling out the magnetic tape; and
   a guide member for guiding the tape pull-out member;
   wherein:
   the tape pull-out member is engaged with a groove formed in the guide member;
   the tape pull-out member is movable between a first position and a second position along the groove;
   the first position is a tape pull-out completion position in the vicinity of the rotatable head cylinder at which information recording to, and information reproduction from, the magnetic tape is possible;
   the second position is a position in an opening of the tape cassette, at which information recording to, and information reproduction from, the magnetic tape is impossible;

the rotatable head cylinder is provided on a cylinder holding member integrally formed with the guide member such that the cylinder holding member and the guide member are formed as a single unitary body;

a profile of the groove is continuous with no gap; and the guide member extends from the tape cassette opening to the tape pull-out completion position.

2. A magnetic recording and reproduction apparatus for performing information recording to, and/or information reproduction from, a tape which is run after being pulled out from a tape cassette and wound around a rotatable head cylinder, the magnetic recording and reproduction apparatus comprising:

a tape pull-out member which is located in an opening of the tape cassette in a cassette mountable state, and, while moving toward a tape pull-out completion position in the vicinity of the rotatable head cylinder, pulls out the tape from the tape cassette and winds the tape around the rotatable head cylinder, so as to place the magnetic recording and reproduction apparatus into a tape pull-out completion state; where the cassette mountable state is a state of the magnetic recording and reproduction apparatus in which the tape cassette can be mounted thereon, and the tape pull-out completion state is a state of the magnetic recording and reproduction apparatus in which the tape has been pulled out from the tape cassette and wound around the rotatable head cylinder such that the tape is capable of running;

a boss portion included in the tape pull-out member;

a guide member for guiding the tape pull-out member such that the tape pull-out member is reciprocally movable between the opening in the tape cassette and the tape pull-out completion position; and a cylinder holding member having the rotatable head cylinder provided thereon, the cylinder holding member being integrally formed with the guide member such that the cylinder holding member and the guide member are formed as a single unitary body, wherein:

the tape pull-out member is movable on a top surface of the guide member;

the guide member has a groove which is engaged with the boss portion;

a profile of the groove is continuous with no gap, and the guide member extends from the tape cassette opening to the tape pull-out completion position.

3. A magnetic recording and reproduction apparatus according to claim 2, wherein the cylinder holding member and the guide member include at least one resin selected from the group consisting of PPS (polyphenylene sulfide), PES (polyether sulfone), PEI (polyetherimide), PC (polycarbonate), PA (polyamide), PI (polyimide), PBT (polybutylenetelephthalate), PPE (denatured polyphenylene ether), LCP (liquid crystal polymer), and PEEK (polyetheretherketone).

4. A magnetic recording and reproduction apparatus according to claim 2, further comprising:

a positioning section for positioning the tape pull-out member at the tape pull-out completion position;

wherein the cylinder holding member, the guide member and the positioning member are integrally formed together.

5. A magnetic recording and reproduction apparatus according to claim 4, wherein:

the boss portion has a stepped portion;

the tape pull-out member includes a U-shaped boat plate;

the boss portion has a pivotable boat driving member;

the boat driving member is provided between the stepped portion and the boat plate; and the magnetic recording and reproduction apparatus is assembled such that the tape pull-out member is movable relative to the guide member by inserting the boss portion into the groove, engaging the boat driving member with the boss portion; and then elastically deforming the boat plate and engaging the boat plate with the stepped portion.

6. A magnetic recording and reproduction apparatus for performing information recording to, and/or information reproduction from, a tape which is run after being pulled out from a tape cassette and wound around a rotatable head cylinder, the magnetic recording and reproduction apparatus comprising:

a tape pull-out member which is located in an opening of the tape cassette in a cassette mountable state, and, while moving toward a tape pull-out completion position in the vicinity of the rotatable head cylinder, pulls out the tape from the tape cassette and winds the tape around the rotatable head cylinder, so as to place the magnetic recording and reproduction apparatus into a tape pull-out completion state; where the cassette mountable state is a state of the magnetic recording and reproduction apparatus in which the tape cassette can be mounted thereon, and the tape pull-out completion state is a state of the magnetic recording and reproduction apparatus in which the tape has been pulled out from the tape cassette and wound around the rotatable head cylinder such that the tape is capable of running;

a guide member for guiding the tape pull-out member such that the tape pull-out member is reciprocally movable between the opening in the tape cassette and the tape pull-out completion position;

a cylinder holding member having the rotatable head cylinder provided thereon, the cylinder holding member being integrally formed with the guide member such that the cylinder holding member and the guide member are formed as a single unitary body, and the guide member extends from the tape cassette opening to the tape pull-out completion position.

7. A magnetic recording and reproduction apparatus according to claim 6, wherein the cylinder holding member and the guide member include at least one resin selected from the group consisting of PPS (polyphenylene sulfide), PES (polyether sulfone), PEI (polyetherimide), PC (polycarbonate), PA (polyamide), PI (polyimide), PBT (polybutylenetelephthalate), PPE (denatured polyphenylene ether), LCP (liquid crystal polymer), and PEEK (polyetheretherketone).

8. A magnetic recording and reproduction apparatus according to claim 7, further comprising a positioning section for positioning the tape pull-out member at the tape pull-out completion position;

wherein the positioning section, the guide member and the cylinder holding member are integrally formed together.

* * * * *